US008787343B2

(12) United States Patent
Taghavi Nasrabadi et al.

(10) Patent No.: US 8,787,343 B2
(45) Date of Patent: Jul. 22, 2014

(54) EFFICIENT METHOD FOR DETERMINING A PREFERRED ANTENNA PATTERN

(75) Inventors: Mohammad Hossein Taghavi Nasrabadi, San Diego, CA (US); Hemanth Sampath, San Diego, CA (US); Avinash Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 791 days.

(21) Appl. No.: 12/947,798

(22) Filed: Nov. 16, 2010

(65) Prior Publication Data

US 2011/0286372 A1 Nov. 24, 2011

Related U.S. Application Data

(60) Provisional application No. 61/263,214, filed on Nov. 20, 2009, provisional application No. 61/262,020, filed on Nov. 17, 2009.

(51) Int. Cl.
*H04H 20/67* (2008.01)

(52) U.S. Cl.
USPC .............. 370/339; 370/350; 370/310

(58) Field of Classification Search
None
See application file for complete search history.

(56) References Cited

U.S. PATENT DOCUMENTS

| 7,474,641 | B2* | 1/2009 | Kuroda | 370/329 |
|---|---|---|---|---|
| 8,553,620 | B2* | 10/2013 | Ko et al. | 370/328 |
| 2004/0014431 | A1* | 1/2004 | Lo | 455/73 |
| 2009/0189812 | A1* | 7/2009 | Xia et al. | 342/374 |
| 2009/0231196 | A1 | 9/2009 | Niu et al. | |
| 2009/0239486 | A1* | 9/2009 | Sugar et al. | 455/101 |

FOREIGN PATENT DOCUMENTS

| WO | 03039032 A1 | 5/2003 |
|---|---|---|
| WO | 2006086576 A2 | 8/2006 |

OTHER PUBLICATIONS

Gharavi-Alkhansari M et al., "Fast antenna subset selection in wireless mimo systems", Proceedings of International Conference on Acoustics, Speech and Signal Processing (ICASSP'03) Apr. 6-10, 2003 Hong Kong, China; [IEEE International Conference on Acoustics, Speech, and Signal Processing (ICASSP)], 2003 IEEE International—Conference, vol. 5, Apr. 6, 2003, pp. V_57-V_60, XP010639207, DOI: DOI:10.1109/ICASSP.2003.1199867 ISBN: 978-0-7803-7663-2.
Gore D et al., "Receive antenna selection for mimo flat-fading channels: theory and algorithms", IEEE Transactions on Information Theory, IEEE, US, vol. 49, No. 10, Oct. 1, 2003, pp. 2687-2696, XP011102246, ISSN: 0018-9448, DOI: DOI:10.1109/TIT.2003.817458.
Heath R W et al., "Multimode Antenna Selection for Spatial Multiplexing Systems With Linear Receivers", IEEE Transactions on Signal Processing, IEEE Service Center, New York, NY, US, vol. 53, No. 8, Aug. 1, 2005, pp. 3042-3056, XP011136488, ISSN: 1053-587X, DOI: DOI:10.1109/TSP.2005.851109.
International Search Report and Written Opinion—PCT/US2010/057071, ISA/EPO—Jul. 6, 2011.
Molisch A F et al., "MIMO systems with antenna selection", IEEE Microwave Magazine, IEEEservice Center, Piscataway, NJ, US, vol. 5, No. 1, Mar. 1, 2004, pp. 46-56, XP011110924, ISSN: 1527-3342, DOI: DOI:10.1109/MMW.2004.1284943.

* cited by examiner

*Primary Examiner* — Kibrom T Hailu
(74) *Attorney, Agent, or Firm* — Dang M. Vo

(57) ABSTRACT

Aspects of the present disclosure propose a method for determining preferred transmit and receive antenna patterns of a wireless device with respect to another wireless device. The method generally includes determining the beamforming or calibrating coefficients corresponding to the preferred transmit and receive antenna patterns of a wireless device iteratively.

35 Claims, 10 Drawing Sheets

EFFICIENT METHOD FOR DETERMINING A PREFERRED ANTENNA PATTERN

CLAIM OF PRIORITY UNDER 35 U.S.C. §119

The present application for patent claims priority to U.S. Provisional Application No. 61/263,214, entitled, "Efficient Method For Determining The Best Antenna Beam Pattern," filed Nov. 20, 2009, and U.S. Provisional Patent Application Ser. No. 61/262,020, entitled, "Calibration in Directional Wireless Communications," filed Nov. 17, 2009, both assigned to the assignee hereof and expressly incorporated herein by reference.

TECHNICAL FIELD

Certain aspects of the present disclosure generally relate to wireless communications and, more particularly, to determining preferred transmit and receive antenna patterns or calibrating transmit and receive antennas of a wireless device in directional wireless communications.

BACKGROUND

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial streams, where, for all the practical purposes, $N_S \leq \min\{N_T, NR\}$. The $N_S$ spatial streams may be used to transmit $N_S$ independent data streams to achieve greater overall throughput.

SUMMARY

Certain aspects of the present disclosure provide a method for wireless communications. The method generally includes iteratively receiving, with a subset of antennas of a first apparatus, a plurality of reference signals transmitted by a second apparatus, wherein each reference signal is received utilizing a different combination of coefficients for the subset of antennas and the subset of antennas is adjusted after each iteration, determining one or more coefficients for one or more antennas in the subset of antennas based on the plurality of received reference signals, and receiving data from the second apparatus with the preferred receive antenna pattern determined utilizing the coefficients.

Certain aspects of the present disclosure provide a method for wireless communications. The method generally includes assigning a plurality of combinations of coefficients to one or more transmit antennas of a first apparatus for transmission in a plurality of iterations, wherein a number of nonzero coefficients in each combination is adjusted in each iteration, transmitting, for each iteration, a plurality of reference signals to a second apparatus, wherein each reference signal is transmitted using one of the combinations of coefficients, receiving a message from the second apparatus, wherein the message comprises an indication of a preferred combination of coefficients for the transmit antennas of the first apparatus, wherein the preferred combination is determined based on quality of a plurality of received reference signals at the second apparatus, and determining the preferred transmit antenna pattern utilizing at least the preferred combination of coefficients.

Certain aspects of the present disclosure provide a first apparatus for wireless communications. The apparatus generally includes a receiver configured to iteratively receive, with a subset of antennas of the first apparatus, a plurality of reference signals transmitted by a second apparatus, wherein each reference signal is received utilizing a different combination of coefficients for the subset of antennas and the subset of antennas is adjusted after each iteration, and a processing system configured to determine one or more coefficients corresponding to a preferred antenna pattern based on the plurality of received reference signals and to configure the receiver to receive data from the second apparatus with the preferred receive antenna pattern.

Certain aspects of the present disclosure provide a first apparatus for determining a preferred transmit antenna pattern for wireless communications. The apparatus generally includes a processing system configured to assign a plurality of combinations of coefficients to one or more transmit antennas of the first apparatus for transmission in a plurality of iterations, wherein a number of nonzero coefficients in each combination is adjusted in each iteration, a transmitter configured to transmit, for each iteration, a plurality of reference signals to a second apparatus, wherein each reference signal is transmitted using one of the combinations of coefficients, and a receiver configured to receive a message from the second apparatus, wherein the message comprises an indication of a preferred combination of coefficients for the transmit antennas of the first apparatus, wherein the preferred combination is determined based on quality of a plurality of received reference signals at the second apparatus, wherein the processing system is configured to determine a preferred transmit antenna pattern utilizing at least the preferred combination of coefficients.

Certain aspects of the present disclosure provide an apparatus for wireless communications. The apparatus generally includes means for iteratively receiving, with a subset of antennas of a first apparatus, a plurality of reference signals transmitted by a second apparatus, wherein each reference signal is received utilizing a different combination of coefficients for the subset of antennas and the subset of antennas is adjusted after each iteration, means for determining one or more coefficients for one or more antennas in the subset of antennas based on the plurality of received reference signals, and means for receiving data from the second apparatus with the preferred receive antenna pattern determined utilizing the coefficients.

Certain aspects of the present disclosure provide an apparatus for wireless communications. The apparatus generally includes means for assigning a plurality of combinations of coefficients to one or more transmit antennas of a first apparatus for transmission in a plurality of iterations, wherein a number of nonzero coefficients in each combination is adjusted in each iteration, means for transmitting, for each iteration, a plurality of reference signals to a second apparatus, wherein each reference signal is transmitted using one of the combinations of coefficients, means for receiving a message from the second apparatus, wherein the message comprises an indication of a preferred combination of coefficients for the transmit antennas of the first apparatus, wherein the preferred combination is determined based on quality of a plurality of received reference signals at the second apparatus, and means for determining the preferred transmit antenna pattern utilizing at least the preferred combination of coefficients.

Certain aspects of the present disclosure provide a computer-program product for wireless communications, comprising a computer-readable medium comprising instructions. The instructions executable for iteratively receiving, with a subset of antennas of a first apparatus, a plurality of reference signals transmitted by a second apparatus, wherein each reference signal is received utilizing a different combination of coefficients for the subset of antennas and the subset of antennas is adjusted after each iteration, determining one or more coefficients for one or more antennas in the subset of antennas based on the plurality of received reference signals, and receiving data from the second apparatus with the preferred receive antenna pattern determined utilizing the coefficients.

Certain aspects of the present disclosure provide a computer-program product for wireless communications, comprising a computer-readable medium comprising instructions. The instructions executable for assigning a plurality of combinations of coefficients to one or more transmit antennas of a first apparatus for transmission in a plurality of iterations, wherein a number of nonzero coefficients in each combination is adjusted in each iteration, transmitting, for each iteration, a plurality of reference signals to a second apparatus, wherein each reference signal is transmitted using one of the combinations of coefficients, receiving a message from the second apparatus, wherein the message comprises an indication of a preferred combination of coefficients for the transmit antennas of the first apparatus, wherein the preferred combination is determined based on quality of a plurality of received reference signals at the second apparatus, and determining the preferred transmit antenna pattern utilizing at least the preferred combination of coefficients.

Certain aspects provide a station for wireless communications. The station generally includes a plurality of antennas, a receiver configured to iteratively receive, with a subset of the antennas of the station, a plurality of reference signals transmitted by a second apparatus, wherein each reference signal is received utilizing a different combination of coefficients for the subset of antennas and the subset of antennas is adjusted after each iteration, and a processing system configured to determine one or more coefficients corresponding to a preferred antenna pattern based on the plurality of received reference signals and to configure the receiver to receive data from the second apparatus with the preferred receive antenna pattern.

Certain aspects provide a station for wireless communications. The station generally includes a plurality of antennas, a processing system configured to assign a plurality of combinations of coefficients to one or more transmit antennas of the station for transmission in a plurality of iterations, wherein a number of nonzero coefficients in each combination is adjusted in each iteration, a transmitter configured to transmit, for each iteration, a plurality of reference signals to a second apparatus, wherein each reference signal is transmitted using one of the combinations of coefficients, and a receiver configured to receive a message from the second apparatus, wherein the message comprises an indication of a preferred combination of coefficients for the transmit antennas of the first apparatus, wherein the preferred combination is determined based on quality of a plurality of received reference signals at the second apparatus, wherein the processing system is configured to determine a preferred transmit antenna pattern utilizing at least the preferred combination of coefficients.

DETAILED DESCRIPTION

Various aspects of certain aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

An Example MIMO System

Figure 1:
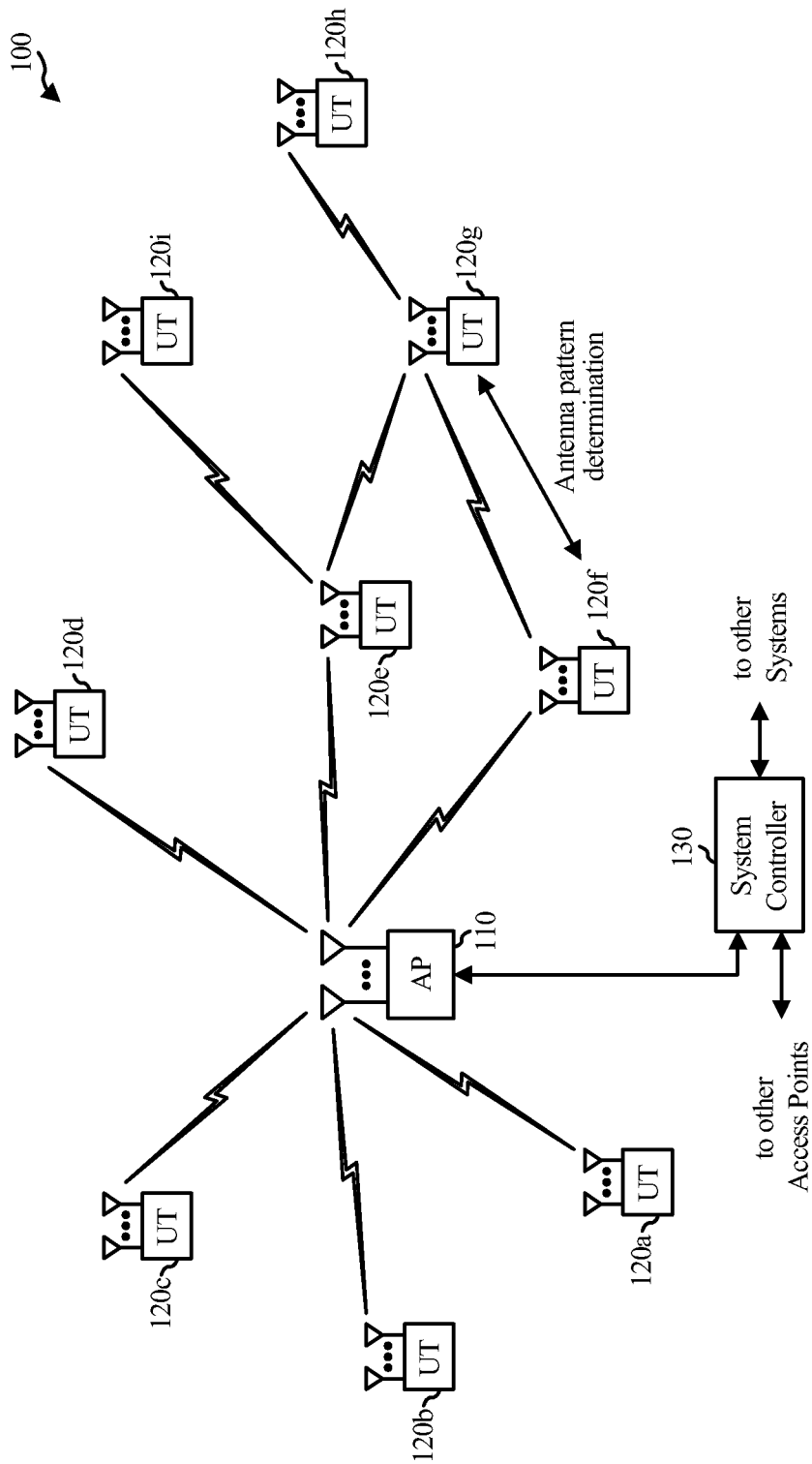
FIG. 1 illustrates a diagram of a wireless communications network, in accordance with certain aspects of the present disclosure.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

As illustrated in FIG. 1, user terminal 120f may communicate peer-to-peer with user terminal 120g. According to certain aspects, user terminals 120f and 120g may help each other to determine preferred transmit and receive antenna patterns (e.g., beamforming coefficients) for each terminal. For certain aspects, user terminal 120f may receive reference signals from user terminal 120g and select a preferred receive antenna pattern based on the quality of reference signals received by each of its receive antennas.

Figure 2:
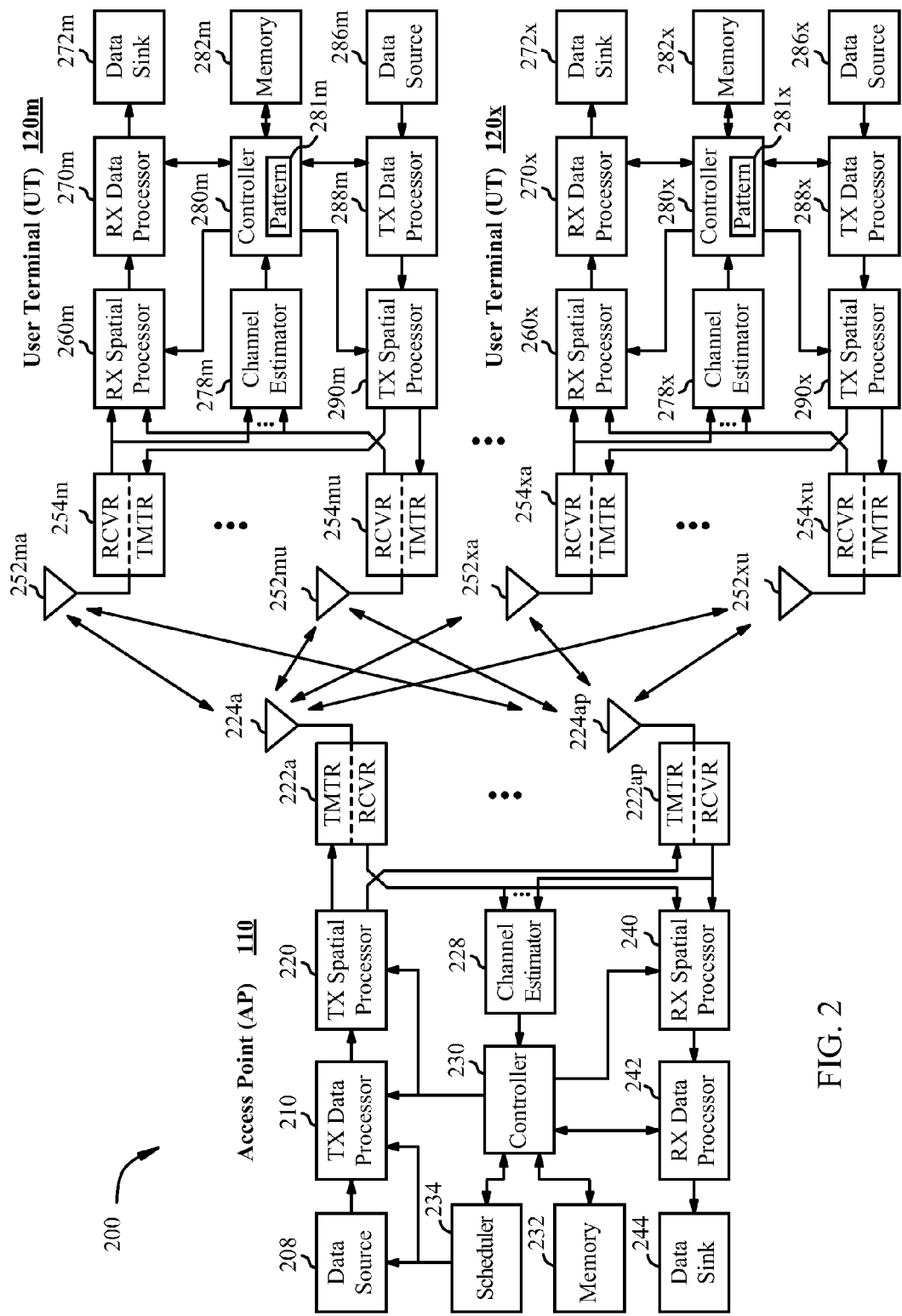
FIG. 2 illustrates a block diagram of an example access point and user terminals, in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. The controller may also include an antenna pattern determining component 281 that selects preferred transmit and receive antenna patterns (e.g., beamforming coefficients or calibration coefficients) for the user terminal 120. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
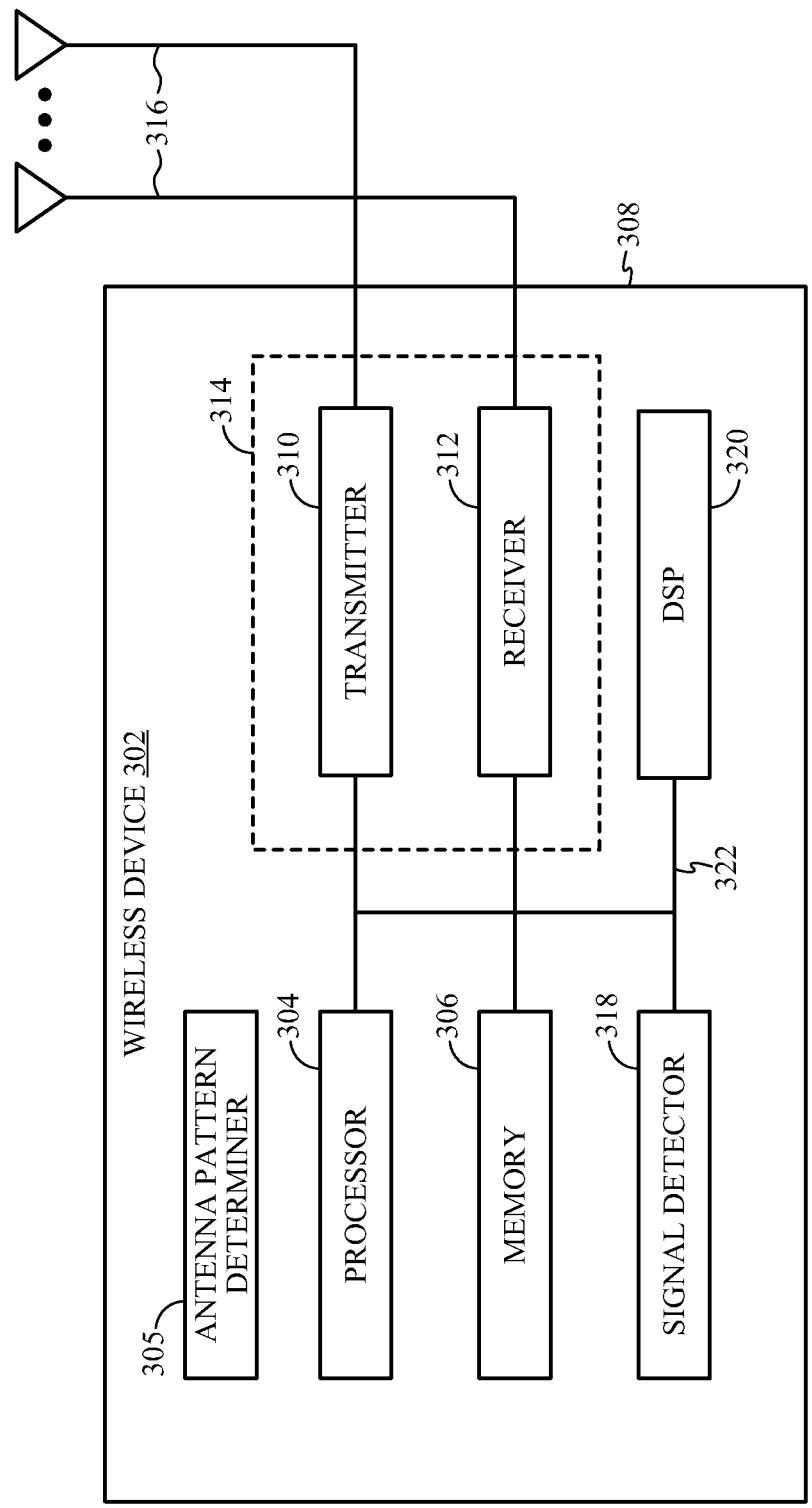
FIG. 3 illustrates a block diagram of an example wireless device, in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include an antenna pattern determiner 305 that determines transmit and receive antenna patterns (e.g., beamforming coefficients) for the plurality of transmit and receive antennas 316.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Certain aspects of the present disclosure propose a method for determining preferred transmit and receive antenna patterns of a device for communicating with another device utilizing beamforming. The proposed method may also be used to calibrate transmit and receive antennas of the device.

Beamforming is an essential element of communications in high frequency bands such as 60 GHz. Beamforming codebooks, such as the codebook utilized in the Institute of Electrical and Electronics Engineers (IEEE) 802.15.3c standard, are not effective in certain situations. For example, different unknown phase offsets and other asymmetries may exist between different elements of an antenna array. In addition, codebooks given for uniform linear or rectangular arrays may not be effective for arrays of arbitrary geometries and antenna types. Also, a pattern of beams generated by a set of beamforming coefficients may vary with frequency. Usually, exchanging and negotiating codebooks may require additional signaling between devices. In a peer to peer link between two devices, preferred transmit and receive antenna patterns of the devices with respect to each other may be determined for high-throughput communications.

Certain aspects of the present disclosure present techniques for determining preferred transmit and receive antenna patterns of a device with respect to another device without relying on codebooks and array manifolds. The proposed method may maximize quality of the communication link between the devices.

Figure 4:
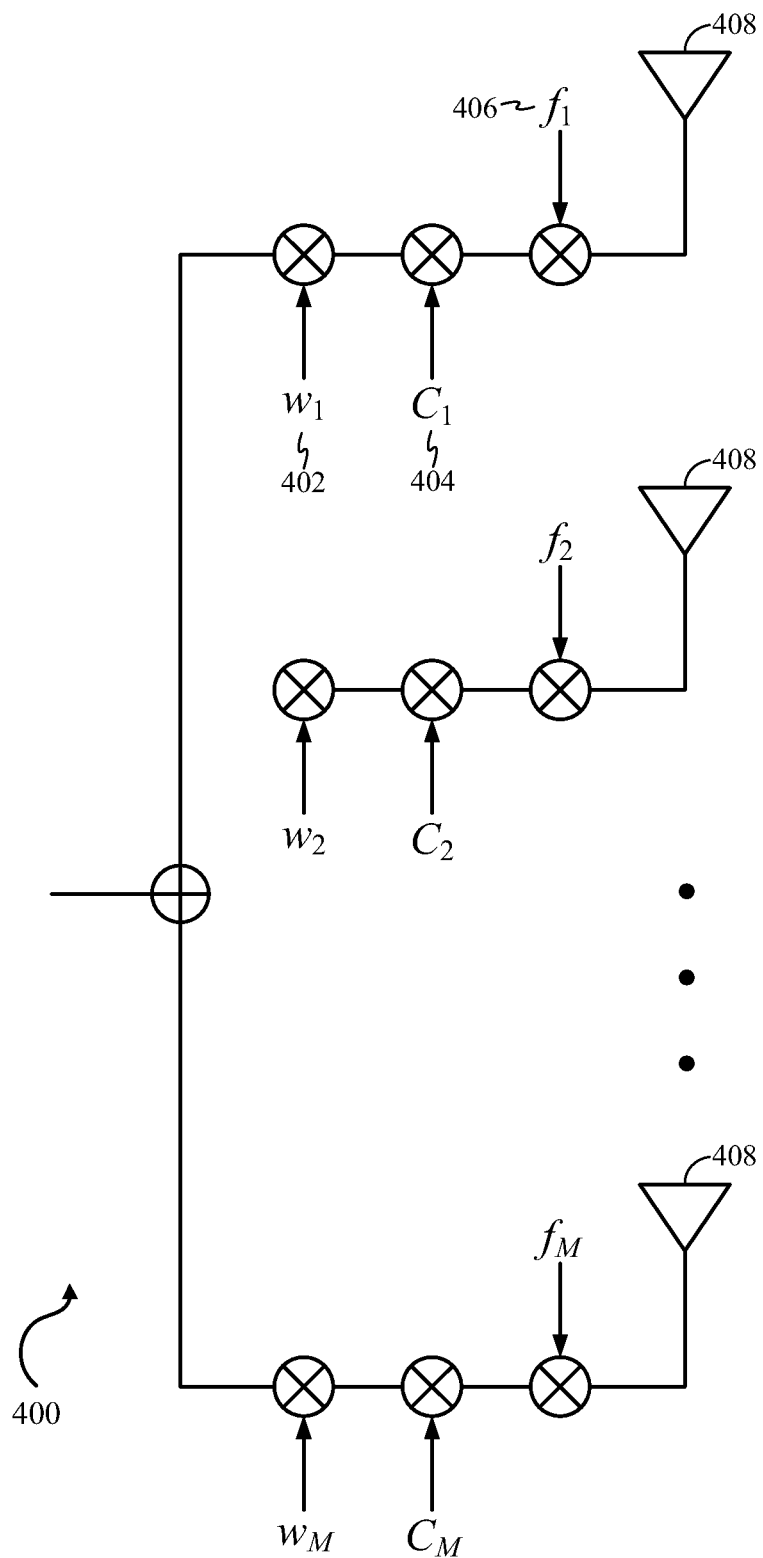
FIG. 4 illustrates an example block diagram of a transmitter, in accordance with certain aspects of the present disclosure.

FIG. 4 illustrates an example block diagram of a transmitter, in accordance with certain aspects of the present disclosure. The transmitter may transmit one or more signals from a plurality of transmit antennas 408. The signals may be multiplied with beamforming coefficients (e.g., beamforming weights) before transmission in the correct direction. The beamforming weights $w_1, w_2, \ldots, w_M$ 402 for M antennas 408 of the transmitter may be selected from a defined finite set of values A (e.g., an alphabet). As an example, A may be equal to the set {+1, j, −1, −j}, as suggested in the IEEE 802.15.3c beamforming codebooks. The beamforming weights may be written as follows:

$$w_m = e^{jk_m\pi/2}, k_1, \ldots, k_M \in \{0, 1, 2, 3\}$$

It should be noted that the codebook may have any number of codewords without changing the analysis presented in this disclosure.

Figure 5:
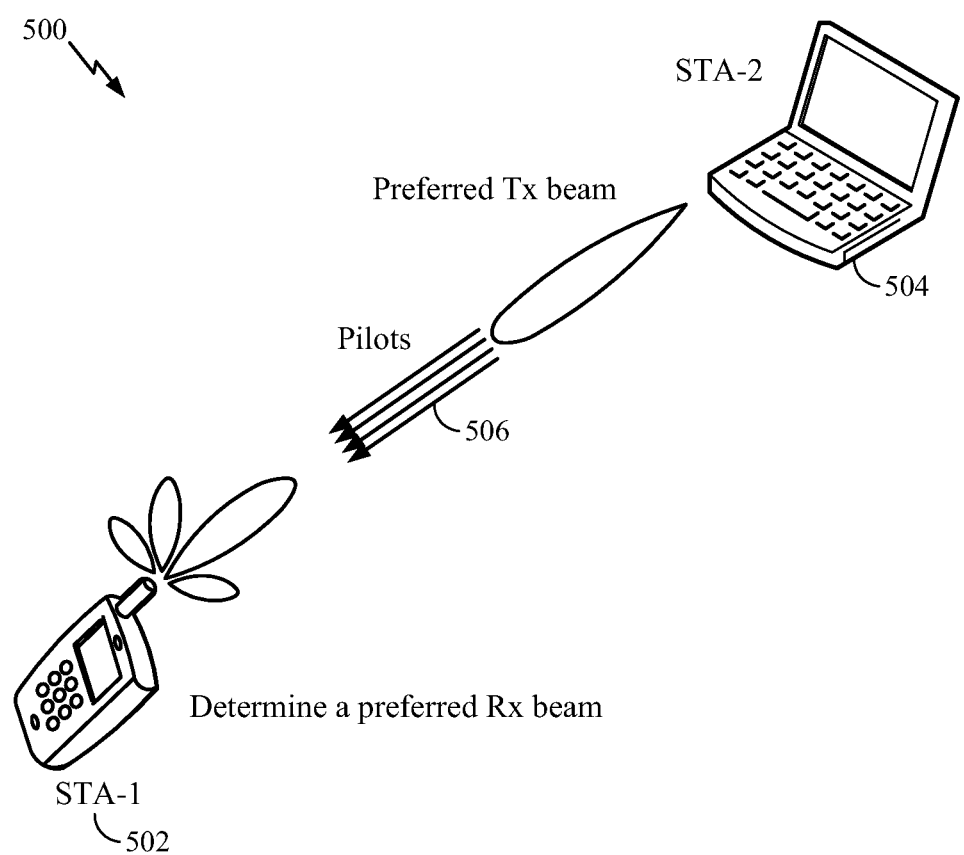
FIG. 5 illustrates an example diagram for determining preferred transmit and receive antenna patterns of a station with respect to another station, in accordance with certain aspects of the present disclosure.

FIG. 5 illustrates a communication system 500, in accordance with certain aspects of the present disclosure. As illustrated, stations STA1 502 and STA2 504 may help each other to determine preferred sets of transmit and receive beamforming coefficients that may be utilized to generate preferred transmit and receive antenna patterns. STA-2 may help STA-1 by transmitting reference signals (e.g., pilot signals) to STA-1 or receiving reference signals from STA-1. It may be assumed that STA-1 and STA-2 are close to each other so that they can communicate with a reliable modulation and coding scheme without relying on high antenna gains. Having a strong path between STA-1 and STA-2 is a reasonable requirement for applications such as side loading, in which data may be transferred between two local devices. For certain aspects, spreading and repetition coding may also be used to increase quality of the link between STA-1 and STA-2.

Certain aspects of the present disclosure propose an iterative method for determining beamforming weights corresponding to preferred transmit and/or receive antenna patterns. The beamforming weights determined based on the proposed method may replace predetermined set of beamforming coefficients and help increase system efficiency.

The beamforming weights that maximize gain towards STA-2 may be determined either by an exhaustive search among all combinations of weights or by a more efficient iterative search method as proposed in this document. For example, to determine M beamforming coefficients, search space for an exhaustive search method may cover $4^{(M-1)}$ possibilities and search space for the proposed iterative method may cover 4(M−1) possibilities. Therefore, for 4, 8 and 16 beamforming coefficients, the exhaustive search method may search among 64, 16384, and $1.7 \times 10^{13}$ possibilities, respectively. Whereas, the search space for the proposed iterative technique for determining preferred transmit and receive antenna patterns may cover 12, 28 and 60 possibilities for determining 4, 8 and 16 beamforming coefficients, respectively.

For certain aspects, in order to find the preferred transmit and receive antenna patterns of STA-1, it may be assumed that STA-2 has previously selected a transmit and receive antenna beam pattern to communicate with STA-1. This antenna pattern for STA-2 may remain unchanged through the process. The transmit and receive beams of STA-2 may use one or more antennas. Without loss of generality, it may be assumed that the beamforming weights $w_1, w_2, \ldots, w_M$ for STA-1 are selected from an alphabet of size q symbols, in which q may be an integer.

For certain aspects, there may be more than one beamforming coefficient for each antenna of STA-1. For example, each coefficient may correspond to a different frequency or time delay (e.g., in a tapped-delay line). When the antenna array response is frequency dependent, instead of one coefficient, a plurality of coefficients (e.g., a filter) may be determined for the antenna.

For certain aspects, a subset of antennas of STA-1 may be operating at each time instant while searching among possible beamforming weights iteratively. In addition, STA-1 and STA-2 may send and receive a plurality of reference signals. For certain aspects, one or more weights may be changed and/or the subset of antennas may be switched on or off at each step.

As illustrated in FIG. 5, beamforming coefficients for preferred receive antenna pattern of a station may be selected incrementally. Assuming that STA-1 has N antennas and determines M beamforming coefficients for the antennas, where M>=N. At the beginning, STA-1 502 may turn off N−1 antennas, and keep only one of the antennas operating. For example, STA-1 may choose to keep the first antenna on. The STA-1 may initialize its beamforming coefficients with the following values: $w_1=1, w_2=0 \ldots, w_M=0$. In general, $w_1$ may have any nonzero value.

STA-1 502 may select the beamforming coefficients $w_2, \ldots, w_M$ one by one by performing the following iterative procedure. First, STA-2 504 may transmit q pilot signals 506 to STA-1 in the direction of its preferred transmit beam. As mentioned before, q may be size of the alphabet from which beamforming weights $w_1, w_2, \ldots, w_M$ are selected. Meanwhile, STA-1 may try to receive each of the pilot signals using one of the q possible values in the alphabet in order to select the $m^{th}$ beamforming coefficient. STA-1 may select the preferred beamforming coefficient $w_m$, by measuring power of the received pilot signals, and choosing the coefficient corresponding to the pilot signal with the highest received power or the highest signal to noise ratio (SNR) value. The selected coefficient $w_m$ may remain fixed for some or all of the remaining iterations. By iterating through the above process, STA-1 may select M beamforming coefficients for the N receive antennas.

Certain aspects of the present disclosure propose a method for finding preferred transmit antenna pattern of a station. For certain aspects, if the receive and transmit array manifolds of STA-1 are similar, the beamforming coefficients that were determined for the receive antennas may also be used for the corresponding transmit antennas of STA-1.

For certain aspects, when preferred transmit and receive antennas of a station are different, a preferred transmit antenna pattern of station (e.g., STA-1) for transmissions to STA-2 may be determined by incrementally turning antennas on or changing the corresponding beamforming coefficients. For example, STA-1 may set all of its beamforming coefficients to zero, except one coefficient (e.g., $w_1=1, w_2=0 \ldots, w_M=0$). STA-1 may set one of the coefficients (e.g., $w_m$, m=2, . . . , M) equal to one at each iteration.

STA-1 may transmit q pilot signals, each of which may be transmitted using a different value from the set of q values in the alphabet. STA-2 may try to receive all of the pilot signals. STA2 may determine index of a preferred value for $w_m$ by measuring power of the received pilot signals and selecting the pilot that is received with the highest power or highest SNR. STA-2 may send a feedback message to STA-1. The feedback message may indicate quality of the received pilot signals at STA-2. The feedback may include information about the preferred value for $w_m$, such as the index of the preferred value for $w_m$. Next, STA-1 may determine the beamforming coefficient $w_m$ based on the received information. STA-1 may keep the coefficient $w_m$ fixed through the rest of the process or for a few iterations, as needed.

For certain aspects, the feedback message transmitted from the STA-2 to the STA-1 may have any format. For example, the feedback message may be transmitted utilizing Sector Sweep (SS) feedback or channel measurement feedback as described in the IEEE 802.11ad specification.

For certain aspects, in the process of determining the preferred transmit antenna pattern, STA-2 may send one or more indices of the preferred coefficients to STA-1 after every k iterations, k=2, ..., M instead of after every iteration.

For certain aspects, the proposed iterative may be used to generate low resolution or high resolution beams by varying number of operating antennas. For example, two operational modes such as wide beam and narrow beam may be defined for a station. $M_1$ antennas may be used for the wide beam mode of operation and $M_2$ antennas may be used for the narrow beam mode of operation, where $M_1 < M_2$. Therefore, the wide-beam mode may generate a wide, low resolution, low-gain beam and the narrow beam mode may generate a narrow, high resolution, high gain beam.

For certain aspects, other variations of the proposed iterative method for determining beamforming coefficients for preferred transmit and receive beams of a station also fall within the scope of this disclosure. For example, at any iteration, one or more beamforming coefficients may be determined while keeping the other beamforming coefficients constant and turning one or more of the antennas on and off. As an example, by turning off some of the antennas, the corresponding coefficients for these antennas may be assumed to be equal to zero while determining the rest of the coefficients.

For certain aspects, another variation of the proposed method may be a pair-wise receive antenna beam pattern selection, in which two coefficients may be nonzero at any given time. In the pair-wise method, each beamforming coefficient may be determined relative to one of the coefficients (e.g., $w_1$). At the beginning, STA-1 may set all of its beamforming coefficients to zero, except one of the coefficients (e.g., the first coefficient) such that $w_1 = c, w_2 = 0 \ldots, w_M = 0$ in which c is a constant (e.g., 1). For m=2, ..., M, STA-1 may perform the following operations: STA-2 may transmit q pilot signals using its preferred transmit antenna pattern. Meanwhile, STA-1 may try to receive each of the q pilot signals using one of the q possible values for the beamforming coefficient $w_m$. STA-1 may determine a preferred value for $w_m$ based on the power of the received pilots. The value of $w_m$ may be the $m^{th}$ beamforming coefficient after the end of the loop. STA-1 may then temporarily set the $m^{th}$ coefficient back to zero until the end of the loop and find another beamforming coefficient relative to $w_1$.

For certain aspect, a repetitive method may be used to determine a receive antenna pattern, which may be considered as a variation of the technique described above. In the repetitive technique, two or more antennas of STA-1 may be on at any given time. STA-1 may start with an initial set of values for the beamforming coefficients $w_1, w_2, \ldots, w_M$. The initial set of coefficient may include any values including zeros.

For example, STA-1 may utilize the beamforming coefficients obtained by one of the variations of the above technique as the initial values. For each value of m, selected from $\{1, 2, \ldots, M\}$ with an order, with possible repetitions, STA-2 may transmit q pilots in the direction of the preferred transmit beam for transmissions from STA-2 to STA-1. Meanwhile, STA-1 may try to receive each of the q pilots using one of the q values in the alphabet for $w_m$, while keeping the other coefficients fixed, equal to their latest value. STA-1 may determine a preferred value for $w_m$ based on the power of the received pilots. The preferred value of $w_m$ may replace the previous value of $w_m$, and the process may continue until all the beamforming coefficients are updated. The station may update one or more of the coefficients in each iteration.

For certain aspects, one of the proposed methods may be used to generate initial values for the beamforming coefficients. In addition, the algorithm for determining the preferred receive and transmit antenna patterns may be performed one more time without setting the coefficients to zero, to further tune the beamforming coefficients.

For certain aspects of the present disclosure, STA-2 may be a reference transceiver that is a part of a station. For example, STA-2 may be a transceiver on the same board as the main transceiver in the station. In this case, filters may be used to attenuate signals at the reference transceiver.

Antenna Calibration

For certain aspects, a variation of the proposed method for finding the preferred transmit and receive beams may be used for over the air calibration of a station in a wireless communication network. The calibration method may utilize another station or a calibrating device with a strong line of sight to the station to calibrate transmit and receive antennas of the station.

Beamforming codebooks, such as the codebook utilized in the IEEE 802.15.3c standard, may not be effective if different phase offsets and other asymmetries exist between different elements of an antenna array. Therefore, phase calibration of different antennas may be necessary if offsets are significant.

To calibrate the antennas internally, additional circuitry may be needed which could be very expensive for low-cost handheld devices. Certain aspects of the present disclosure propose an over-the-air calibration method for low cost phase offset calibration.

Referring back to FIG. 4, which illustrates an example block diagram of a transmitter, independent random phase offsets $f_m$ 406, $f_m = e^{j\alpha_m}$, $\alpha_m \in [0, 2\pi]$ may affect each beamforming weight $w_m$. Therefore, the effective weight $u_m$ on antenna m may be written as follows:

$$u_m = w_m f_m = e^{j(k_m \frac{\pi}{2} + \alpha_m)}$$

In addition, the phase offsets $f_m$ may slowly change over time or as a result of temperature variations. A goal for calibration is to compensate for the phase offset $f_m$ by multiplying the beamforming weights $w_m$ by calibration weights $c_m$ 404, $c_m = e^{jl_m \pi/2}$, $l_1, \ldots, l_M \in \{0, 1, 2, 3\}$. Therefore, an overall effective weight for antenna m may be written as follows:

$$u_m = w_m c_m f_m.$$

where $w_m c_m$ is the weight controlled from the baseband and $f_m$ is the offset introduced by the radio frequency (RF) circuitry.

If the phase offsets $f_m$ are known, during calibration, the calibration coefficient $c_m$ may be chosen so that the term $c_m f_m$ is equal to or very close to one. If $\alpha_m$ is known, residual phase offset $\alpha'_m$ may be used in calculating the phase offset $f'_m$ as follows:

$$f'_m = c_m f_m = e^{j\alpha'_m}, \alpha'_m \in \left[-\frac{\pi}{4}, +\frac{\pi}{4}\right].$$

For example, if $\alpha_i = 9\pi/8$, then $f_i$ may be written as $$f_i = e^{j(\pi + \frac{\pi}{8})}.$$

Also, $c_i$ may be chosen as $c_i = e^{-j\pi} = -1$. Therefore, the overall weight on antenna i may be written as $f'_i = c_i f_i = e^{j\pi/8}$.

Certain aspects of the present disclosure propose a technique for over-the-air calibration of a station. In this technique, antenna arrays of a station (e.g., STA-1) are calibrated so that proper beams can still be generated by the original beamforming codebook. The proposed technique utilizes another station (e.g., STA-2) or a calibrating device with line-of-sight or a strong path to STA-1 to calibrate the antennas of STA-1. Having a strong path to STA-1 is a reasonable requirement for applications such as side loading, in which data may be transferred between two local devices. STA-2 may also be a stationary device such as a kiosk. For certain aspects, in order to achieve high quality in the link between STA-1 and STA-2, spreading and repetition coding may be used by STA-2.

Generally, beamforming codebooks rotate a single beam pattern or an antenna pattern by different angles. For certain aspects, if a set of weights are found that create a good beam pointing at a specific angle, one or more additional antenna patterns (e.g. beams pointing at different angles) may be created by multiplying the corresponding set of weights by codewords in the codebook.

The weights that maximize gain toward a specific angle may be found either by an exhaustive search among all combinations of weights or by a more efficient iterative search method as proposed in this document. For M antennas, the search space for the exhaustive search method may cover $4^{(M-1)}$ possibilities and the search space for the iterative method may cover $4(M-1)$ possibilities. Therefore, for 4, 8 and 16 antennas, the exhaustive search method may search among 64, 16384 and $1.7 \times 10^{13}$ possibilities, respectively. Whereas, the search space for the proposed iterative technique for determining calibration coefficients may cover 12, 28 and 60 possibilities for 4, 8 and 16 antennas, respectively.

For certain aspects of the present disclosure, an iterative method is proposed for calibrating transmit and receive antennas of a station. In order to calibrate the antennas of a station (e.g., STA-1), at first, preferred transmit and receive beams of the calibrating device (e.g., STA-2) to transmit to and receive from STA-1 may be determined.

Figure 6:
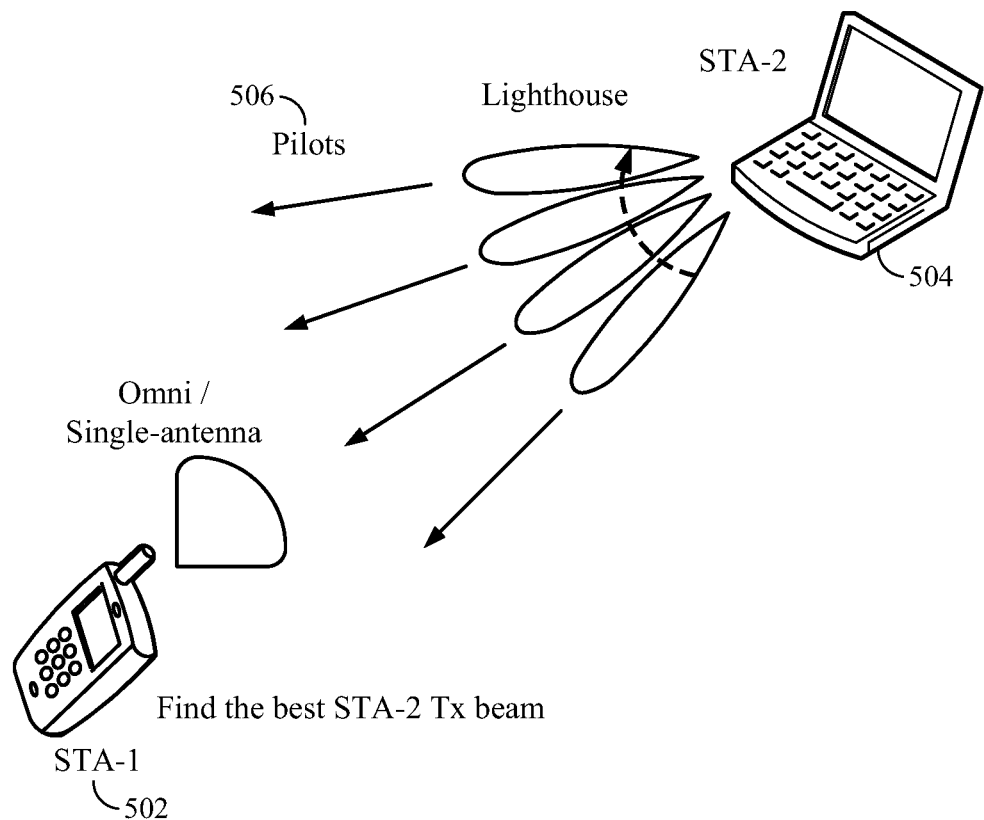
FIG. 6 illustrates an example for selecting preferred transmit and receive beams of a calibrating device for transmitting to or receiving from a station, in accordance with certain aspects of the present disclosure.
Figure 6:

FIG. 6 illustrates an example setup for selecting preferred transmit and receive beams of a calibrating device (e.g., STA-2) to transmit to or receive from a station (e.g., STA-1), in accordance with certain aspects of the present disclosure. First, STA-1 502 may turn off all of its antennas except one antenna which may be Omni-directional. Alternatively, STA-1 may switch to an antenna configuration with a quasi-Omni-directional pattern to utilize one or more operating antennas. A Quasi-Omni-directional pattern may be an antenna pattern with a wide beam which may be wider than the beams used for directional communications. For example, a quasi-Omni-directional pattern may be created by utilizing only one antenna, or a plurality of antennas by employing a specific combination of weights.

STA-2 504 may transmit a plurality of signals (e.g., pilot or reference signals) in a lighthouse manner, using different transmit beams. STA-2 may generate each transmit beam by utilizing a different combination of coefficients for signal transmission. STA-1 may measure power of the received signals and determine a preferred transmit beam for transmissions from STA-2 to STA-1.

Next, STA-1 502 may help STA-2 to select a preferred receive beam for receiving transmissions from STA-1. STA-1 may use a single antenna to transmit multiple signals (e.g., training pilots). Number of the signals may be equal to the number of receive beams at STA-2 504. STA-2 may measure power of the received signals and determine a preferred receive beam for receiving transmissions from STA-1 by selecting the signal with the highest received power.

While STA-2 utilizes the preferred receive beam, STA-1 sends a feedback message to STA-2, the feedback may include index of the preferred transmit beam for transmissions from STA-2 to STA-1.

For certain aspects, STA-2 may help calibrate transmit and receive antennas of STA-1 by utilizing the preferred transmit and receive beams to communicate with STA-1. The calibration process may be performed incrementally, in which calibration coefficients for a preferred receive beam of STA-1 are determined by incrementally turning on antennas of STA-1.

For certain aspects, antennas of a station may be calibrated incrementally similar to the method for finding the preferred transmit and receive beams, as illustrated in FIG. 5. At the beginning, STA-1 502 may turn off all of its antennas, except one of the antennas. For example, STA-1 may choose to keep the first antenna on and set its calibration coefficients for antennas 1 through M equal to the following values: $c_1=1$, $c_2=0 \ldots, c_M=0$, STA-1 may also consider $w_1=1$ $w_2=1, \ldots$, $w_M=1$ (e.g., no beamforming codebook).

It should be noted that assigning zero beamforming weights (or calibration coefficients) to an antenna may be equivalent to turning that antenna off.

STA-1 502 may turn on the remaining of its antennas one by one to calibrate each antenna separately using the proposed iterative method. STA-2 504 may transmit multiple pilot signals 506 in the direction of its preferred transmit beam to STA-1. Meanwhile, STA-1 may try to receive each of the pilots using one of the possible values for calibration coefficients. STA-1 may select the calibration coefficients from a finite set of values, such as $\{+1, j, -1, -j\}$, therefore, STA-2 may transmit a finite number of pilot signals (e.g., q=four pilot signals in this example). STA-1 may consider q possible values for $c_m$ and try to receive each pilot using one of the q possible values $\{+1, j, -1, -j\}$. STA-1 may measure power of the received pilots and determine a preferred value for $c_m$ based on the received pilot strengths. STA-1 may choose the value corresponding to the pilot received with the highest power as the calibration coefficient $c_m$ for its $m^{th}$ receive antenna. By iterating through the above process, STA-1 may calibrate all of its receive antennas.

When STA-1 determines calibration coefficients for all of its antennas, STA-1 may use the coefficients $c_1, c_2, \ldots, c_M$ to calibrate its transmissions to other stations. For example, if STA-1 wants to steer K beams towards other stations, it may generate the $k^{th}$ beam by assigning weight $w_{m,k} c_m$ to antenna m, where $c_1, c_2, \ldots, c_f$ are the calibration coefficients that are determined for antennas $1, \ldots, M$ which may be independent of k. The values $w_{1,k}, w_{2,k}, \ldots, w_{M,k}$ are the beamforming weights, that may be chosen form a codebook defined for beam k in the absence of phase offsets, e.g., the codebook in the IEEE 802.15.3c standard.

It should be noted that in the above calibration method, the correspondence between beam index and center angle of beams may not be preserved. For example, indexing of beams may start from angle θ, instead of angle 0. Also, with two or more levels of beam resolution, hierarchy of fine and coarse beams may be preserved.

Certain aspects of the present disclosure propose a method for calibrating transmit antennas of a station in addition to calibrating the receive antennas. For certain aspects, if the receive and transmit array manifolds of STA-1 are similar, the beamforming coefficients that were determined for the receive antennas may also be used for the corresponding transmit antennas of STA-1. However, if transmit and receive antennas require separate calibration, the transmit antennas of STA-1 may be calibrated as follows.

For certain aspects, when preferred transmit and receive antennas of a calibrating station (e.g., STA-2) are determined, these preferred beams may be used to calibrate transmit antennas of a station (e.g., STA-1). In order to determine calibration coefficients for a preferred transmit beam for transmissions from STA-1 to STA-2, STA-1 may turn off all of its antennas, except antenna 1. For example, STA-1 may set calibration coefficients as follows: $c_1=1$, $c_2=0$ . . . , $c_M=0$, STA-1 may then turn on the rest of its antennas (e.g., m=2, . . . , M) one by one to calibrate.

STA-1 may transmit multiple pilots, each of which may be transmitted using a different value from a defined set of values or an alphabet. For example, if the set has four different values, STA-1 may use four values as the calibration coefficient $C_m$ for antenna m. STA-2 may try to receive all of the pilots. STA-2 may determine index of a preferred value for $C_m$ by measuring power of the received pilots and determining the pilot received with the highest power. STA-2 may then send a feedback to STA-1, the feedback may include an index of the preferred value for $C_m$. This value may be used as the calibration coefficient $C_m$ for antenna m by STA-1.

For certain aspects, there may be variations to the proposed calibration technique for calibrating transmit or receive antennas of a station (e.g., STA-1). For example, at any iteration, calibration coefficients for one or more antennas may be determined while keeping the calibration coefficients and beamforming weights for other antennas constant. As an example, by turning off some of the antennas, the corresponding coefficients for these antennas are kept equal to zero.

For certain aspects, a pair-wise receive calibration may be used in which two antennas may be on at any given time. Therefore, STA-1 may turn off all of its antennas, except antenna 1 and for antennas m=2, . . . , M, STA-1 may perform the following operations: STA-1 may turn on antenna m. STA-2 may transmit multiple pilots using its preferred transmit beam direction. Meanwhile, STA-1 may try to receive each of the multiple pilots using one of the possible values in a defined set of values as the calibration coefficient $c_m$. STA-1 determines a preferred value for $C_m$ based on the power of the received pilots. STA-1 may then turn off the $m^{th}$ antenna and turn on another antenna to calibrate.

For certain aspect, a repetitive receive antenna calibration technique may be used which is a variation of the calibration technique described above. In the repetitive technique, after finding the preferred transmit and receive beams of STA-2, two antennas of STA-1 may remain on at any given time. STA-1 may start calibrating its receive antennas by considering an initial set of values for the calibration coefficients $C_1$, $C_2$, . . . , $c_M$.

For example, STA-1 may utilize the calibration coefficients obtained by one of the variations of the calibration technique. For each value of m, selected from {1, 2, . . . , M} with an order, with possible repetitions, STA-2 may transmit a plurality of pilots in the direction of the preferred transmit beam for transmissions from STA-2 to STA-1. Meanwhile, STA-1 may try to receive each of the pilots using one of the possible values in the alphabet, such as {+1, j, −1, −j}, for calibration coefficient $c_m$, while keeping the other calibration coefficients fixed, equal to their latest value. STA-1 may determine a preferred value for $c_m$ based on the power of the received pilots. The preferred value of $c_m$ may replace the previous value of $c_m$, and the process may continue until all the calibration coefficients are updated.

For certain aspects, one of the proposed calibration methods may be used to generate initial values for the calibration coefficients. In addition, the calibration algorithm may be performed one more times while keeping all the antennas on, to further tune the calibration coefficients.

For certain aspects, the calibration coefficients for each antenna may correspond to one or more frequencies or time delays (e.g., in a tapped-delay line). For example, if the antenna array response is frequency dependent, instead of one coefficient, a plurality of coefficients (e.g., a filter) may be considered for each antenna.

For certain aspects of the present disclosure, a station (e.g., STA-1) and the helping device (e.g., STA-2) may communicate with a reliable modulation and coding scheme with limited antenna gain.

For certain aspects of the present disclosure, the helping device may be a reference transceiver that is a part of the station. For example, the helping device may be a transceiver on the same board as the main transceiver in the station. In this case, filters may be used to attenuate signals at the reference transceiver.

Figure 7:
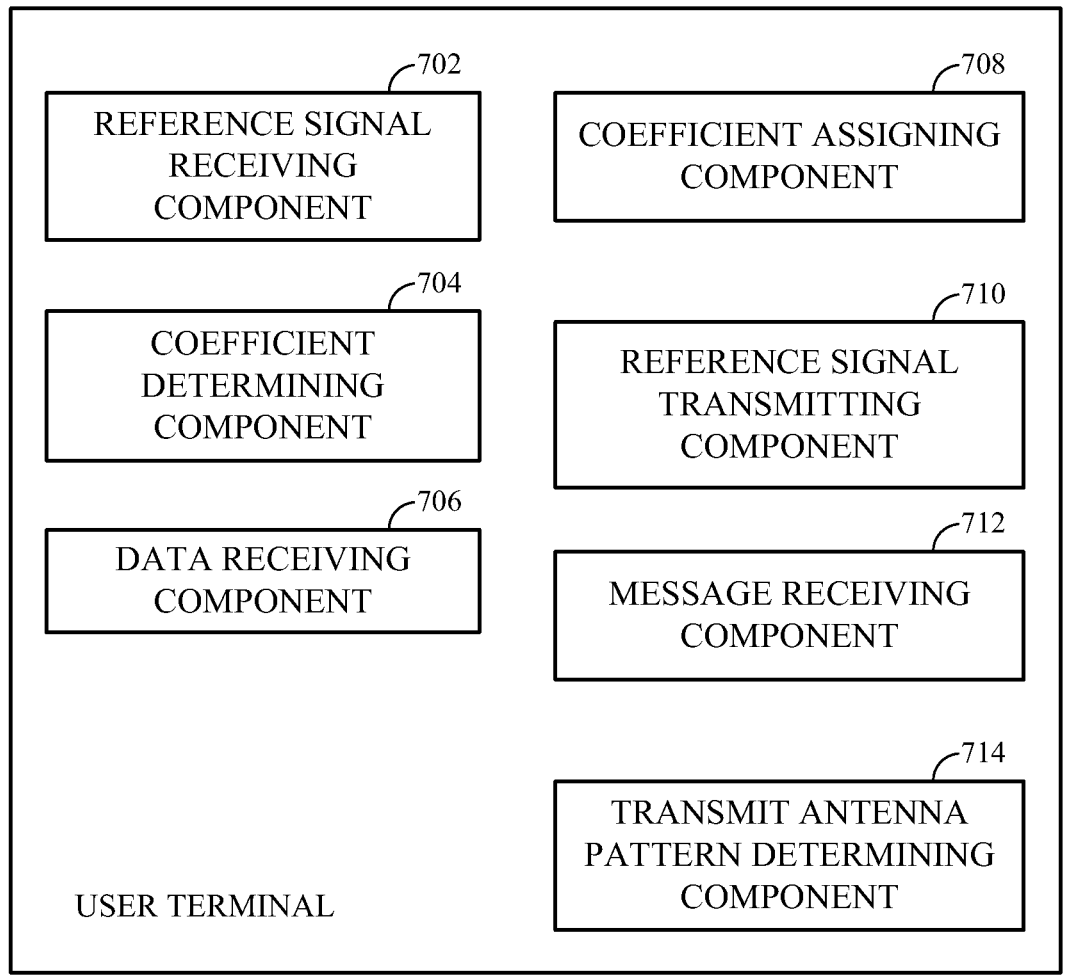
FIG. 7 illustrates a block diagram a user terminal, in accordance with certain aspects of the present disclosure.

FIG. 7 illustrates a functional block diagram of a station utilizing the proposed antenna pattern determination/calibration scheme. The station may include a reference signal receiving component 702 that receives reference signals from another station. The station may also include a coefficient determining component 704 that determines beamforming or calibration coefficients based on the received reference signals. By utilizing the determined coefficients, the station may adjust its receive antennas and receive data utilizing a data receiving component 706.

The station may also be able to determine a preferred transmit antenna pattern by utilizing one or more of the following components. The station may utilize a coefficient assigning component 708 that assigns beamforming or calibration coefficients to one or more transmit antennas of the station. The station may transmit reference signals using a reference signal transmitting component (e.g., transmit antenna). The station may receive a message by a message receiving component 712 (e.g., a receive antenna) from the other station comprising one or more preferred coefficients for adjusting coefficients of one or more of its transmit antennas. The station may determine a preferred transmit antenna pattern using a transmit antenna pattern determining component 714 utilizing the message received from the other station. For certain aspects, the first and the second apparatuses may be incorporated in a single apparatus.

Figure 8:
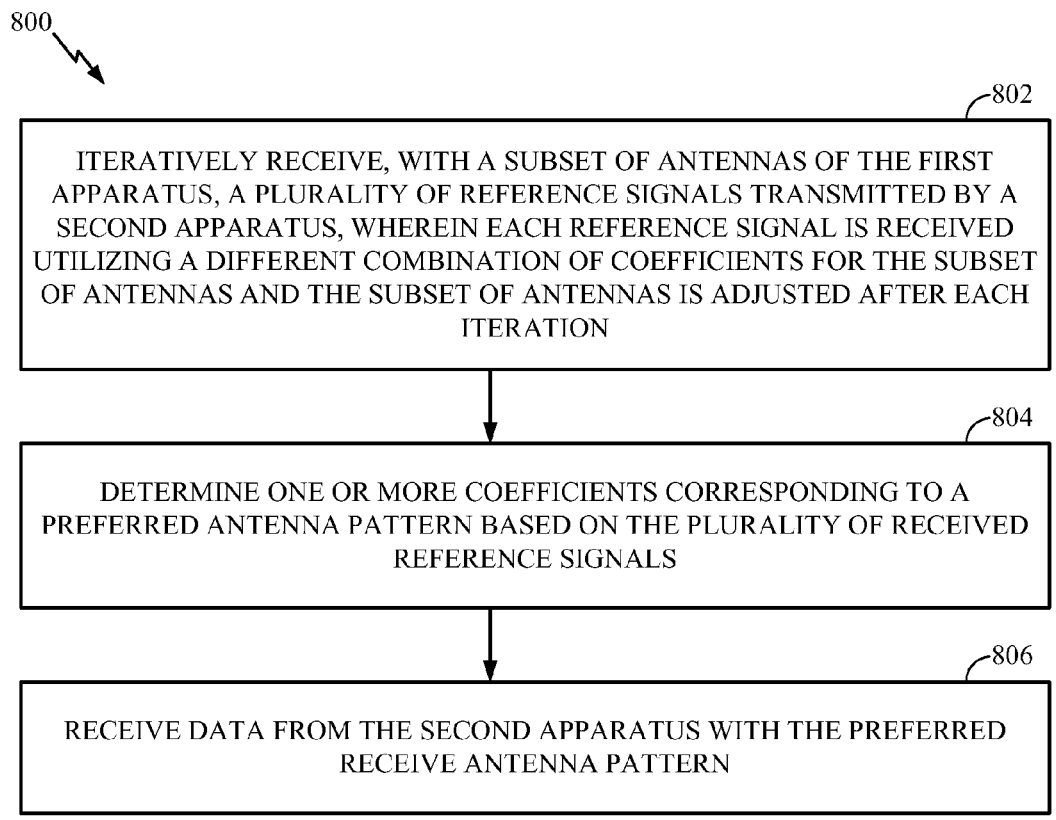
FIG. 8 illustrates example operations for determining a preferred receive antenna pattern of a first wireless device with respect to a second wireless device, in accordance with certain aspects of the present disclosure.

FIG. 8 illustrates example operations for determining a preferred receive antenna pattern or calibrating a first apparatus with respect to a second apparatus, in accordance with certain aspects of the present disclosure. At 802, the first apparatus may receive, in each iteration, a plurality of reference signals transmitted by the second apparatus with a subset of antennas of the first apparatus, wherein each reference signal is received utilizing a different combination of coefficients for the subset of antennas, and the subset of antennas is adjusted after each iteration. For example, the number of antennas in the subset of antennas may be adjusted by adding to or deleting one or more antennas from the subset.

At 804, the first apparatus may determine one or more coefficients for one or more antennas in the subset of antennas based on the plurality of received reference signals. For other iterations, the station may adjust the subset of antennas and receive another plurality of reference signals transmitted by the second apparatus, and determine one or more coefficients for the adjusted subset of antennas based on the plurality of reference signals. At 806, the first apparatus may receive data from the second apparatus with the preferred receive antenna pattern determined utilizing the coefficients.

Figure 9:
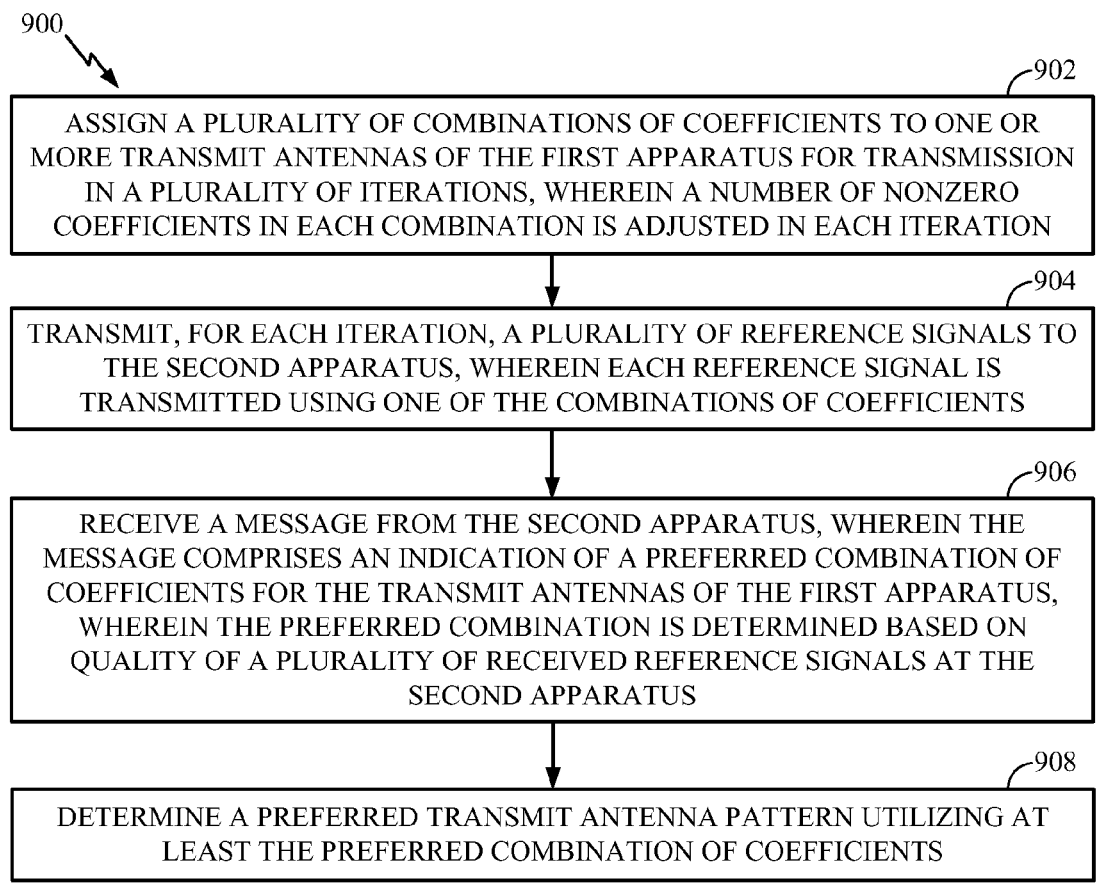
FIG. 9 illustrates example operations for determining a preferred transmit antenna pattern for a first wireless device with respect to a second wireless device, in accordance with certain aspects of the present disclosure.

FIG. 9 illustrates example operations for determining a preferred transmit antenna pattern or calibrating a first apparatus with respect to a second apparatus, in accordance with certain aspects of the present disclosure. At 902, the first apparatus may assign, for each iteration, a plurality of combinations of coefficients to one or more transmit antennas of the first apparatus, wherein a number of nonzero coefficients in each combination is adjusted in each iteration. The first apparatus may determine the plurality of combinations of coefficients by selecting one or more nonzero coefficients and setting remaining coefficients to zero.

At 904, the first apparatus may transmit, for each iteration, a plurality of reference signals to the second apparatus, wherein each reference signal is transmitted using one of the combinations of coefficients. At 906, the first apparatus may receive a message from the second apparatus, wherein the message comprises an indication of a preferred combination of the coefficients for the transmit antennas of the first apparatus, wherein the preferred combination is determined based on quality of a plurality of received reference signals at the second apparatus. At 908, the first apparatus may determine the preferred transmit antenna pattern utilizing at least the preferred combination of the coefficients.

Certain aspects of the present disclosure proposed methods for finding preferred transmit or receive antenna pattern or calibrating transmit and receive antennas of a station by utilizing a helping device with a strong path to the station. The helping device may be used to transmit reference signals to the station to help in finding preferred receive beam or calibrate receive antennas of the station. The helping device may also receive reference signals from the station and send feedback to the station to help find the preferred transmit antenna pattern or calibrate transmit antennas of the station.

Figure 8A:
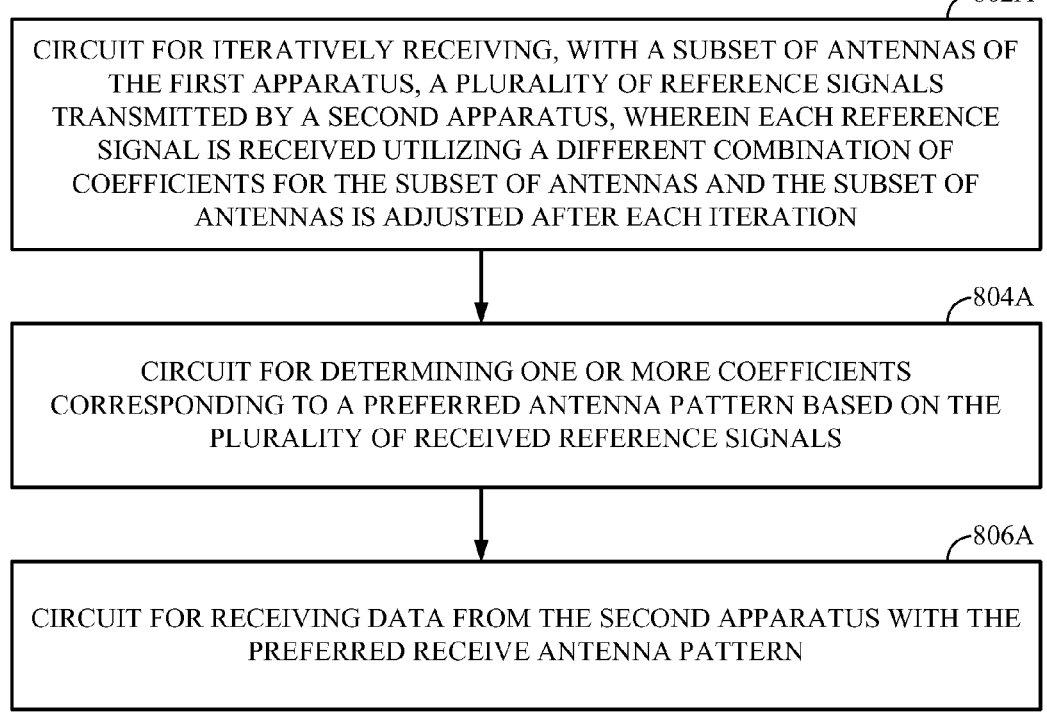
FIG. 8A illustrates example components capable of performing the operations shown in FIG. 8.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 802-806 in FIG. 8 correspond to circuit blocks 802A-806A illustrated in FIG. 8A.

For example, means for receiving may comprise any suitable receiving component such as the reference signal receiving component 702 and/or the data receiving component 706. Means for determining may comprise any suitable determining component, such as the coefficient determining component 704. These components may be implemented with any suitable components, such as one or more processors, for example, such as the RX data processor 270m and/or controller 280m of the user terminal 120m illustrated in FIG. 2.

Figure 9A:
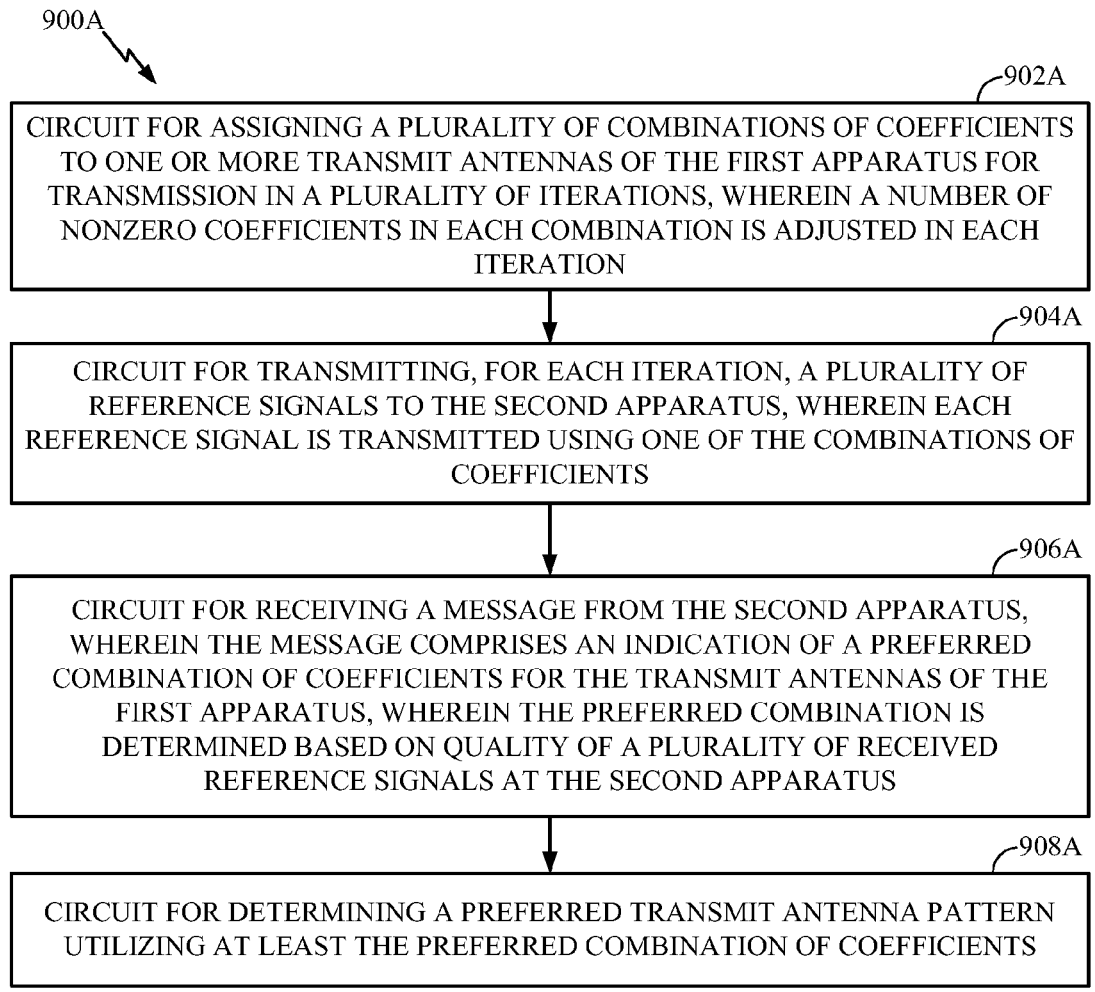
FIG. 9A illustrates example components capable of performing the operations shown in FIG. 9.

In addition, blocks 902-908 in FIG. 9 correspond to circuit blocks 902A-908A illustrated in FIG. 9A. For example, means for assigning may comprise any suitable assigning component such as the coefficient assigning component 708. Means for transmitting may comprise any suitable transmitting component such as the reference signal transmitting component 710. Means for receiving may comprise any suitable receiving component such as the message receiving component 712. Means for determining may comprise any suitable determining component, such as the transmit antenna pattern determining component 714. These components may be implemented with any suitable components, such as one or more processors, for example, such as the TX data processor 288m and/or controller 280m of the user terminal 120m illustrated in FIG. 2.

As used herein, the phrase "at least one of A or B" is meant to include any combination of A and B. In other words, "at least one of A or B" comprises A or B or A and B.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Various functions described herein may be performed by a processing system. The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry (not shown), and at least a portion of the machine-readable media integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, a mobile handset, or other type of wireless device with processing logic and elements to perform the techniques provided herein.

While the foregoing is directed to aspects of the present invention, other and further aspects of the invention may be devised without departing from the basic scope thereof, and the scope thereof is determined by the claims that follow.

The invention claimed is:

1. A first apparatus for determining a preferred transmit antenna pattern for wireless communications, comprising:
    a processing system configured to assign a plurality of combinations of coefficients to one or more transmit antennas of the first apparatus for transmission in a plurality of iterations, wherein a number of nonzero coefficients in each combination is adjusted in each iteration;
    a transmitter configured to transmit, for each iteration, a plurality of reference signals to a second apparatus, wherein each reference signal is transmitted using one of the plurality of combinations of coefficients; and
    a receiver configured to receive a message from the second apparatus, wherein the message comprises an indication of a preferred combination of coefficients for the one or more transmit antennas of the first apparatus, wherein the preferred combination of coefficients is determined based on a quality of at least one of a plurality of received reference signals at the second apparatus;

wherein the processing system is further configured to determine a selected transmit antenna pattern utilizing at least the preferred combination of coefficients.

2. The first apparatus of claim 1, wherein the transmitter is configured to transmit data to the second apparatus with the selected transmit antenna pattern.

3. The first apparatus of claim 1, wherein:
the processing system is configured to adjust the plurality of combinations of coefficients by selecting one or more nonzero coefficients and setting any remaining coefficients to zero.

4. The first apparatus of claim 3, wherein:
the processing system is further configured to alter the number of nonzero coefficients for at least one iteration.

5. The first apparatus of claim 4, wherein the processing system is configured to alter the number of nonzero coefficients by:
adding another one or more nonzero coefficients to the combination of coefficients.

6. The first apparatus of claim 1, wherein one or more coefficients in the preferred combination of coefficients for the one or more transmit antennas correspond to one or more frequencies.

7. The first apparatus of claim 1, wherein the first and the second apparatuses are incorporated in a single apparatus.

8. The first apparatus of claim 1, wherein each coefficient is selected from a finite set of values comprising an alphabet.

9. The first apparatus of claim 1, wherein the processing system is configured to determine the selected transmit antenna pattern utilizing a beamforming codebook and the preferred combination of coefficients.

10. The first apparatus of claim 9, wherein the processing system is further configured to generate one or more additional transmit antenna patterns by utilizing the beamforming codebook and the selected transmit antenna pattern.

11. The first apparatus of claim 1, wherein the plurality of reference signals is used by the second apparatus to determine a preferred receive antenna pattern for receiving transmissions from the first apparatus to the second apparatus.

12. A method for wireless communications, comprising:
assigning a plurality of combinations of coefficients to one or more transmit antennas of the first apparatus for transmission in a plurality of iterations, wherein a number of nonzero coefficients in each combination is adjusted in each iteration;
transmitting, for each iteration, a plurality of reference signals to a second apparatus, wherein each reference signal is transmitted using one of the plurality of combinations of coefficients;
receiving a message from the second apparatus, wherein the message comprises an indication of a preferred combination of coefficients for the one or more transmit antennas of the first apparatus, wherein the preferred combination of coefficients is determined based on a quality of at least one of a plurality of received reference signals at the second apparatus; and
determining a selected transmit antenna pattern utilizing at least the preferred combination of coefficients.

13. The method of claim 12, further comprising:
transmitting data to the second apparatus with the selected transmit antenna pattern.

14. The method of claim 12, further comprising:
adjusting the plurality of combinations of coefficients by selecting one or more nonzero coefficients and setting any remaining coefficients to zero.

15. The method of claim 14, further comprising:
altering the number of nonzero coefficients for at least one iteration.

16. The method of claim 15, wherein the altering of the number of nonzero coefficients comprises:
adding another one or more nonzero coefficients to the combination of coefficients.

17. The method of claim 12, wherein one or more coefficients in the preferred combination of coefficients for the one or more transmit antennas correspond to one or more frequencies.

18. The method of claim 12, wherein the first and the second apparatuses are incorporated in a single apparatus.

19. The method of claim 12, wherein each coefficient is selected from a finite set of values comprising an alphabet.

20. The method of claim 12, wherein the determining of the selected transmit antenna pattern comprises:
determining the selected transmit antenna pattern utilizing a beamforming codebook and the preferred combination of coefficients.

21. The method of claim 20, further comprising:
generating one or more additional transmit antenna patterns by utilizing the beamforming codebook and the selected transmit antenna pattern.

22. The method of claim 12,
wherein the plurality of reference signals is used by the second apparatus to determine a preferred receive antenna pattern for receiving transmissions from the first apparatus to the second apparatus.

23. A first apparatus for wireless communications, comprising:
means for assigning a plurality of combinations of coefficients to one or more transmit antennas of the first apparatus for transmission in a plurality of iterations, wherein a number of nonzero coefficients in each combination is adjusted in each iteration;
means for transmitting, for each iteration, a plurality of reference signals to a second apparatus, wherein each reference signal is transmitted using one of the plurality of combinations of coefficients;
means for receiving a message from the second apparatus, wherein the message comprises an indication of a preferred combination of coefficients for the one or more transmit antennas of the first apparatus, wherein the preferred combination of coefficients is determined based on a quality of at least one of a plurality of received reference signals at the second apparatus; and
means for determining a selected transmit antenna pattern utilizing at least the preferred combination of coefficients.

24. The first apparatus of claim 23, further comprising:
means for transmitting data to the second apparatus with the selected transmit antenna pattern.

25. The first apparatus of claim 23, further comprising:
means for adjusting the plurality of combinations of coefficients by selecting one or more nonzero coefficients and setting any remaining coefficients to zero.

26. The first apparatus of claim 23, further comprising:
means for altering the number of nonzero coefficients for at least one iteration.

27. The first apparatus of claim 26, wherein the means for altering the number of nonzero coefficients comprises:
means for adding another one or more nonzero coefficients to the combination of coefficients.

28. The first apparatus of claim 23, wherein one or more coefficients in the preferred combination of coefficients for the one or more transmit antennas correspond to one or more frequencies.

29. The first apparatus of claim 23, wherein the first and the second apparatuses are incorporated in a single apparatus.

30. The first apparatus of claim 23, wherein each coefficient is selected from a finite set of values comprising an alphabet.

31. The first apparatus of claim 23, wherein the means for determining the selected transmit antenna pattern comprises:
    means for determining the selected transmit antenna pattern utilizing a beamforming codebook and the preferred combination of coefficients.

32. The first apparatus of claim 31, further comprising:
    means for generating one or more additional transmit antenna patterns by utilizing the beamforming codebook and the selected transmit antenna pattern.

33. The first apparatus of claim 23, wherein the plurality of reference signals is used by the second apparatus to determine a preferred receive antenna pattern for receiving transmissions from the first apparatus to the second apparatus.

34. A computer-program product for determining a preferred transmit antenna pattern, comprising a non-transitory computer-readable medium comprising instructions executable for:
    assigning a plurality of combinations of coefficients to one or more transmit antennas of a first apparatus for transmission in a plurality of iterations, wherein a number of nonzero coefficients in each combination is adjusted in each iteration;
    transmitting, for each iteration, a plurality of reference signals to a second apparatus, wherein each reference signal is transmitted using one of the plurality of combinations of coefficients;
    receiving a message from the second apparatus, wherein the message comprises an indication of a preferred combination of coefficients for the one or more transmit antennas of the first apparatus, wherein the preferred combination of coefficients is determined based on a quality of at least one of a plurality of received reference signals at the second apparatus; and
    determining a selected transmit antenna pattern utilizing at least the preferred combination of coefficients.

35. A station for wireless communications, comprising:
    a plurality of antennas;
    a processing system configured to assign a plurality of combinations of coefficients to one or more transmit antennas of the station for transmission in a plurality of iterations, wherein a number of nonzero coefficients in each combination is adjusted in each iteration;
    a transmitter configured to transmit, for each iteration, a plurality of reference signals to an apparatus, wherein each reference signal is transmitted using one of the plurality of combinations of coefficients; and
    a receiver configured to receive a message from the apparatus, wherein the message comprises an indication of a preferred combination of coefficients for the one or more transmit antennas of the station, wherein the preferred combination of coefficients is determined based on a quality of at least one of a plurality of received reference signals at the apparatus;
    wherein the processing system is further configured to determine a selected transmit antenna pattern utilizing at least the preferred combination of coefficients.

* * * * *